United States Patent [19]

Kingsbury

[11] 3,850,789

[45] Nov. 26, 1974

[54] ASBESTOS FIBER-FILLED BITUMEN SOUND DEADENING LAMINATES

[75] Inventor: Herbert William Kingsbury, Chislehurst, England

[73] Assignee: British Uralite Limited, Rochester, Kent, England

[22] Filed: June 26, 1972

[21] Appl. No.: 266,127

[30] Foreign Application Priority Data
June 28, 1971  Great Britain ................... 30204/71

[52] U.S. Cl. ............... 161/205, 106/282, 106/286, 161/236, 181/33 GA, 252/62
[51] Int. Cl. ..................... B32b 11/02, B32b 19/08
[58] Field of Search ................... 161/205, 236, 152; 181/.5 R, 33 GA; 106/277, 282, 286; 252/62

[56] References Cited
UNITED STATES PATENTS

| | | | |
|---|---|---|---|
| 2,742,374 | 4/1956 | Groskopf | 161/236 |
| 3,509,008 | 4/1970 | Adomshick | 161/205 |

Primary Examiner—Marion E. McCamish
Attorney, Agent, or Firm—Browdy & Neimark

[57] ABSTRACT

Reducing or absorbing the noise transmission of a component such as a metal sheet, metal pressing or metal casting which is prone to vibration by applying directly or indirectly to at least part of the surface thereof a layer of one or more sheets of asbestos fibre-filled bitumen composition, in laminate form, to an overall thickness of at least 1.5 mm, the weight rates of asbestos to bitumen being in the range 40:60 to 60:40

12 Claims, No Drawings

3,850,789

ASBESTOS FIBER-FILLED BITUMEN SOUND DEADENING LAMINATES

This invention relates to sound-deadening, and sound deadening materials.

Increasing attention is being directed to reducing noise from machinery. Noise occurs not only as a result of the moving parts in machinery, but also as a result of sympathetic vibrations in associated components and particularly those devised of flat or profiled thin metal or metal-substitute sheets; for example as in housings for machinery and, in particular, vehicle bodies, truck cabs, transmission tunnels of vehicles, etc.

Many attempts have been made to reduce or absorb the noise transmission of such structures and most have been directed to discovering a suitable material which can be applied to the surface of the structure to damp the vibrations. Suitable materials not only have to be able to provide the required vibration damping over the whole range of operating conditions, particularly of temperature, but also have to resist exposure to weather and to environments such as water and oil, meet requirements as to proof against fire and flame, be able to adopt the contours of the surface of the structure either before or after application to the metal, and be economic in price. Much research has been carried out for suitable materials, particularly in the area of thermoplastics, and many materials have been proposed for use. However, the difficulty of finding a material having all the desired properties is reflected in the lengths to which researchers have gone in producing entirely new plastics materials for the purpose or creating complex mixtures of existing materials.

According to the present invention, we provide a method of reducing or absorbing the noise transmission of a component which is prone to vibration which comprises applying to at least part of the surface thereof a sound deadening layer of one or more self supporting sheets of asbestos fiber-filled bitumen material to an overall thickness for the sound deadening layer of at least 1.5 mm, the weight ratio of asbestos fiber to bitumen in said material being in the range 40:60 to 60:40.

The invention also provides a component which is prone to vibration and applied to at least part of the surface thereof a sound deadening layer of sheet one or more of asbestos fiber-filled bitumen material the total thickness of the sound deadening layer being at least 1.5 mm and the weight ratio of asbestos fibers to bitumen in each sheet being in the range of from 40:60 to 60:40.

The asbestos/bitumen sheets used in the present invention combine satisfactory vibration damping properties, which are long-lasting, with excellent resistance to environmental, fungus and termite attack. For example, the decay rate of a sheet of asbestos fiber-reinforced bitumen having a thickness of about 0.090 inch and a density such as to give a weight of about 7½ ounces/sg.ft and containing about equal weights of asbestos and bitumen has been measured by the Geiger thick plate rate test as 12db/sec when fully bonded to the plate and as high as 26db/sec when unbonded, and tests have shown that little if any deterioration of the material occurs as a result of exposure to atmosphere, even after many years. The sheets are also water-repellant, resistant to creep under normal operational conditions, and resistant to abrasion, e.g., as by foot traffic.

Furthermore, despite the high bitumen content of up to as much as 60% by weight, the compositions have an unexpectedly good performance in fire. Their burn rate in accordance with Motor Vehicle Safety Standard No. 302 of the United States of America Department of Transportation, Federal Highway Administration is "NIL," and their classification in accordance with British Standard 476, Part 3, 1953, is AA.

In the preferred form in which the required sheet thickness is built up by the use of a number of thin laminar of asbestos fibers, the sheets combine all the above properties with the ability to be profiled in softened form without the need for complicated or sophisticated equipment such as is required for thermoforming synthetic plastics materials, and to retain their shape on subsequent re-hardening. Because they can tolerate some local overheating without discoloring or charring, they can be heat-softened for subsequent shaping by use of such unsophisticated devices as gas-air torches, and because in the softened state they are still sufficiently strong to be handled, sophisticated molding equipment is not required. The sheets can also be softened for molding without the application of heat, by exposing them to the vapors of a solvent for the bitumen, e.g., trichloroethylene. On subsequent removal of the absorbed solvent, e.g., by evaporation, the sheets revert to a semi-rigid self-supporting state which will retain almost indefinitely the shape imparted to them and are unexpectedly resilient and resistant to cracking on flexure having regard to the highly brittle nature of each of the two components on its own.

The above-mentioned combination of properties makes the sheets especially suitable for use in motor driven transport, and particularly in motor vehicles, where their fire-resistance and their resistance to atmospheric conditions allow them to be used in engine compartments and in exposed locations at will, their ease of shaping precludes the need for investment in capital-intensive plant, their ability to retain the shape imparted means that they can be applied to components of complicated shape without the need for bonding which can be disadvantageous both from a practical point of view and from the point of view of optimum sound-damping effectiveness in some instances, and their resistance to cracking on flexure may be used to advantage.

The sheets are also formed from readily available and relatively inexpensive materials and compare favorably with synthetic plastics in cost.

The invention is particularly applicable to the damping of sheet metal components by which we mean metal components having a high surface area/weight ratio. Such components may be of extruded, rolled or cast construction. The invention is also applicable to the damping of sheet-like structure of materials used to replace metal, e.g., glass fiber-resin compositions, and to any other structures, whether sheet-like or not, which are prone to vibration, especially as a result of being associated directly or indirectly with machinery.

Although the best results are most generally achieved thereby, it is not essential for the asbestos fiber-filled layer of sheets to be applied directly to the surface of the component, it being acceptable if desired to interpose one or more layers of other materials, e.g., for the purposes of heat insulation, corrosion protection or further noise suppression.

It may also be desired to apply one or more layers of other material on top of the asbestos/bitumen layer, e.g., for heat insulation or further noise suppression.

An example of a material that may be interposed or superposed for additional noise suppression is a noise-absorbing felt such as is conventionally used in the motor industry. The felt is suitable from 6 to 12.5 mm thick but even thicker sections may be used in some instances, e.g., up to 100 mm.

The desired reduction in noise transmission may be achieved in many instances simply by applying a sound deadening layer of asbestos fiber-filled bitumen, preferably in laminal of one or more sheets form to the surface of the component, or, in the case where the component surface is profiled, placing a correspondingly profiled layer, e.g., molded sheeet, of asbestos fiber-filled bitumen next to the profiled surface.

In other cases, however, it can be desirable to bond the layer of sheets to the surface of the component over part or all of the contact area. Where a layer of other material, and especially a noise suppression material, e.g., felt, is interposed between the component surface and the asbestos fiber-filled bitumen sound deadening layer, the latter may be bonded to the interposed layer and this interposed layer may or may not be bonded to the component surface.

Where a profiled laminate is to be formed, sound deadening the layer of asbestos fiber-filled bitumen may be bonded to a metal sheet and the laminate then shaped. Alternatively, a corresponding asbestos fiber-filled bitumen profile may be preformed, e.g., by molding a sheet, and then bonding to the face of the profiled metal sheet, optionally with one or more layers of other material interposed therebetween.

Preferably, the asbestos fiber-filled bitumen sound deadening layer of sheets for use in the invention is at least 2 mm. thick and suitable thicknesses for most applications are from 2 to 6 mm. but even greater thicknesses may be used if desired and in some applications still greater benefits may be obtained by the use thereof. Where the sheets are of laminar construction, i.e., built up a number of thin laminae of asbestos fibers, joining together side-by-side sheets can conveniently be effected by splicing, for which purpose the adjacent edges of the sheets to be joined are delaminated for a short distance into the sheet and the delaminated edges of the adjoining sheets then interposed with each other and pressed together. A strong joint results.

While the sound-deadening properties of the asbestos fiber/bitumen layer are quite adequate, the possibility of including other materials, e.g. finely ground mineral fillers, is not excluded provided that the weight ratio of asbestos fiber to bitumen is maintained within the range 40:60 to 60:40.

Examples of asbestos fiber-filled bitumen sheets that may be used in the invention are those sold under the name "Industrialite."

This invention has a wide range of applications. The main application, however, is in wheeled transportation and motor driven transport where the sound deadening layer may be applied, for example, to bodies, or parts thereof, of motor vehicles and railway rolling stock. In motor vehicles, it may be applied to pressed body shells or parts thereof including vehicle doors, hoods and trunk lids and parts thereof.

For hollow, potentially resonant attachments to driving or driven machinery, whether stationary or mobile, the complete articles or parts thereof may also be treated according to the invention. Examples are casings for dynamos, pumps and engines of all kinds; transmission tunnels in road and rail vehicles and propellor driven ships, sump covers, timing gear covers and valve gear covers for internal combustion engines, and exhaust pipes and silencers for internal combustion engines. For example in propellor shaft tunnels for motor vehicles, bonding an asbestos fiber-filled sound deadening layer of one or more sheets directly to the metal of the tunnel to form a laminate in accordance with the invention has been found very effective.

Another application for the invention is in stationary machinery, e.g., for platforms, or for parts of platforms, upon which stationary driving or driven machinery, e.g., engines, dynamos or pumps, is mounted.

Yet a further application occurs in domestic machinery, e.g., in the production of housings for washing machines, dishwashers and refrigerators, or parts thereof. Another application is in the production of metal sinks, where the sound deadening layer of one or more sheets may be applied to the undersurface.

Another application is in the manufacture of hollow ducts for central heating, air conditioning, wind tunnels, etc.

Yet still another application is in bulkheads, walls, floors, ceilings and parts thereof, in ships and aircraft.

Where it is used in a location exposed to hydrocarbon vapors, for instance in the engine compartment of an internal combustion engine, it is desirable to protect the exposed surface of the asbestos fiber/bitumen layer with an oil-resistant coating.

The invention is now illustrated by the following Examples.

Example 1

The 8-12 thick fiberglass/resin bond liner to a British high performance sports car was replaced by a 2 mm thick sheet delaminatable of asbestos fiber-reinforced bitumen containing approximately equal parts by weight of asbestos and bitumen which was fully bonded to the undersurface of the bond. The vibration damping of the structure was found to be improved and the sheet material unaffected by under-bond emissions, water and salt-spray such as is used on roads in cold weather.

Example 2

A 4 mm thick delaminatable sheet of asbestos fiber-reinforced bitumen containing approximately equal parts by weight of asbestos and bitumen was softened and molded to take the external shape of a rocker-box (valve gear) cover, of a commerical 6-cylinder diesel engine and bonded to the rocker box. Another sheet of the same thickness was laminated to a layer of glass fiber and the laminate similarly molded by heat-softening, and subsequently bonded to the sump of the same engine, and another sheet but of 2 mm thickness was similarly molded and bonded to the front plate (timing gear cover). Excellent reduction in noise from the engine was achieved and similar results were obtained on other commercial diesel engines of the same and other manufactures and of similar and different cubic capacities and of 4 and 6 cylinders. Moreover, the moldings were found to withstand successfully the under-hood conditions of engine emissions, water and salt spray, and elevated operating temperatures.

Example 3

A U-shaped transmission tunnel for the propellor shaft of a commercial vehicle was made by forming a 2 mm thick sheet of sheet of Example 1 to follow the shape of the standard metal tunnel but with 12 mm greater dimensions and a laminate was found by bonding together the sheet and the tunnel with a 12 mm thick layer of sound-deadening felt therebetween. Considerably increased noise suppression was achieved in comparison with the standard method of bonding the felt over the tunnel and laying a molded rubber mat over it.

Similar results were obtained with the propellor shaft tunnel of a tractor.

Example 4

The floor, rear bulkhead, front bulkhead, transmission cover and engine cover of a forward control commercial van were each covered with a 12 mm thick layer of felt bonded to a 4 mm thick delaminatable sheet of the material of Example 1 which had been previously molded to the required contours, so as to give a metal/felt/molded sheet laminate. The cab of a forward-drive heavy lorry was similarly treated. Tests showed reductions in noise levels inside the driving compartments of the vehicles of at least 6 db and in some instances of as much as 10 db.

I claim:

1. A component which is prone to vibration and applied to at least part of the surface thereof a sound deadening layer comprising one or more self-supporting sheets of asbestos fiber-filled bitumen, the total thickness of the sound deadening layer being at least 1.5 mm; and wherein in each sheet the weight ratio of asbestos fibers to bitumen is in the range of from 40:60 to 60:40, and in each sheet the asbestos fibers are in the form of a plurality of discrete laminae lying parallel to the plane of the sheet whereby the sheet can be delaminated for splicing with an adjacent sheet.

2. The combination of claim 1 in which the component is a sheet metal component or sheet-like structure of a metal substitute.

3. The combination claimed in claim 1 in which the component is associated directly or indirectly with machinery.

4. The combination claimed in claim 1 in which the sound deadening layer is bonded to the component surface over part or all of the contact area.

5. The combination claimed in claim 1 in which there is no bonding between the sound deadening layer and the component.

6. The combination claimed in claim 1 in which the sound deadening layer is spaced from the component surface by at least one layer of other material.

7. The combination claimed in claim 1 in which at least one layer of other material is superposed on the sound deadening layer.

8. The combination claimed in claim 7 in which the other material is a noise-suppressing material.

9. The combination of claim 8 in which the noise-suppressing material is felt.

10. The combination of claim 9 in which the felt is 6 to 100 mm thick.

11. The combination of claim 9 in which the felt is 6 to 12.5 mm thick.

12. The combination of claim 7 in which the other material is a noise-suppressing material.

* * * * *

UNITED STATES PATENT OFFICE
CERTIFICATE OF CORRECTION

Patent No. 3,850,789　　　　　　　Dated November 26, 1974

Inventor(s) KINGSBURY

It is certified that error appears in the above-identified patent and that said Letters Patent are hereby corrected as shown below:

Column 3, line 30, insert --the-- before "sound"

Column 4, line 42, "bond liner to" should read --hood liner of--
　　　　　line 44, "sheet delaminatable" should read --delaminatable sheet--
　　　　　line 47, "bond" should read --hood--

Signed and Sealed this twenty-second Day of July 1975

[SEAL]

Attest:

RUTH C. MASON
Attesting Officer

C. MARSHALL DANN
Commissioner of Patents and Trademarks